United States Patent
Goerlich et al.

(10) Patent No.: US 8,733,402 B2
(45) Date of Patent: May 27, 2014

(54) PRESSURE CONTROL VALVE

(75) Inventors: Leszek Goerlich, Leonberg (DE);
Stefan Ruppel,
Heidelberg-Emmertsgrund (DE);
Hartmut Sauter, Renningen (DE)

(73) Assignee: Mahle International GmbH (DE)

( * ) Notice: Subject to any disclaimer, the term of this patent is extended or adjusted under 35 U.S.C. 154(b) by 628 days.

(21) Appl. No.: 13/001,213

(22) PCT Filed: Jun. 16, 2009

(86) PCT No.: PCT/EP2009/057458
§ 371 (c)(1),
(2), (4) Date: Apr. 1, 2011

(87) PCT Pub. No.: WO2009/156303
PCT Pub. Date: Dec. 30, 2009

(65) Prior Publication Data
US 2011/0174397 A1 Jul. 21, 2011

(30) Foreign Application Priority Data
Jun. 25, 2008 (DE) .......................... 10 2008 030 203

(51) Int. Cl.
*F16K 15/14* (2006.01)
(52) U.S. Cl.
USPC ............ 137/859; 251/331; 137/529; 137/514
(58) Field of Classification Search
USPC .......................... 137/859, 514, 529; 251/331
See application file for complete search history.

(56) References Cited

U.S. PATENT DOCUMENTS 1,592,191 A * 7/1926 Etzelt ............................ 137/859
4,267,855 A 5/1981 Bradshaw
5,090,393 A 2/1992 Holch

FOREIGN PATENT DOCUMENTS

| DE | 4022129 A1 | 1/1992 |
| DE | 4413322 A1 | 10/1995 |
| DE | 19615865 A1 | 10/1997 |
| DE | 202004015872 U1 | 2/2006 |
| WO | WO-2005088417 A1 | 9/2005 |

OTHER PUBLICATIONS

Translation of EP 0802470 published Oct. 22, 1997.*
Translation of DE 4413322 published Oct. 19, 1995.*
English abstract for DE-19615865.
English abstract for DE-202004015872.
English abstract for DE-4413322.

* cited by examiner

*Primary Examiner* — Kevin Lee
*Assistant Examiner* — P. Macade Nichols
(74) *Attorney, Agent, or Firm* — Rader, Fishman & Grauer PLLC

(57) ABSTRACT

A pressure control valve including a valve housing having a first opening and second opening. The valve housing including a valve member configured to control gas flow between the first opening and the second opening. The valve member is supported by a first membrane and a second membrane, both of which are formed on a single-piece membrane body.

19 Claims, 2 Drawing Sheets

PRESSURE CONTROL VALVE

CROSS-REFERENCES TO RELATED APPLICATION

This application claims priority to German patent application DE 10 2008 030 203.1 filed on Jun. 25, 2008, and PCT/EP2009/057458 filed on Jun. 16, 2009, both of which are hereby incorporated by reference in their entirety.

TECHNICAL FIELD

The present invention relates to a pressure control valve, in particular for adjusting a vacuum in a crank case of an internal combustion engine, with the features of the preamble of Claim 1.

BACKGROUND

A pressure control valve of this type is known from DE 196 15 865 A1. The pressure control valve has a housing which has a first opening, which can be connected to an intake system of an internal combustion engine, and a second opening, which can be connected to a crank case of the internal combustion engine. A valve member is arranged in the valve housing, which valve member has an adjustable stroke for controlling a cross section through which flow can pass of a gas path which connects the first opening to the second opening. The valve member has a support body which has a first membrane and a second membrane. The first membrane in the valve housing separates a first chamber which communicates with the first opening and with the second opening in a gas-tight manner from a second chamber which communicates with a third opening of the valve housing which is connected to the environment of the pressure control valve. In contrast to this, the second membrane in the valve housing separates the second chamber in a gas-tight manner from a third chamber which communicates through the valve member with the first chamber. In the known pressure control valve, the first membrane is injection moulded onto the support body, whereas the second membrane is produced separately and has a central opening, into which a hollow peg section of the support body is inserted.

U.S. Pat. No. 4,267,855 discloses another pressure control valve which for example can be used for adjusting an exhaust return rate. A valve member is again arranged in the valve housing, with the aid of which member a gas path leading from a first opening to a second opening can be controlled. The valve member is provided with a first membrane and a second membrane, the first membrane separating the gas path in a gas-tight manner from an environmental pressure chamber which communicates with the environment, whereas the second membrane separates the gas path from a control pressure chamber which is connected to a pressure source which provides a control pressure, as a function of which the gas path is to be controlled. In this pressure control valve, the two membranes are produced separately and in each case attached separately to a support body of the valve member.

SUMMARY

DE 40 22 129 A1 discloses a further pressure control valve, with the aid of which for example a crank case can be ventilated. Its valve member has only one membrane, which in a valve housing separates the gas path in a gas-tight manner from an environmental pressure chamber which communicates with the environment.

The present invention is concerned with the problem of specifying an improved embodiment for a pressure control valve of the type mentioned at the start, which is characterised in particular in that it can be produced in a cost-effective manner, improved functionality also being the aim.

This problem is solved according to the invention by the subject matter of the independent claims. Advantageous embodiments form the subject matter of the dependent claims.

The invention is based on the general idea of combining the two membranes to form a common membrane body, which is also injection moulded onto the support body. Separate processes for producing and mounting the membranes on the support body are therefore unnecessary. The production of the valve member and thus of the pressure control valve can thereby be simplified and made more cost-effective. The sealing effect overall can also be improved by the monolithic configuration of the membrane body, that is, by its single-piece, integral production with both membranes, as for example a seal between the two membranes can be omitted. Furthermore, both membranes delimit the second chamber. Increased tightness for the boundary of the second chamber can be realised by the integral construction of the two membranes.

According to an advantageous embodiment, the first membrane has a first seal which interacts with the valve housing, whereas the second membrane has a second seal which interacts with the valve housing. The membrane body can now be configured in a targeted manner so that it delimits the second chamber from the first seal to the second seal without interruptions. The risk of leaks can thus be significantly reduced.

According to a particularly advantageous embodiment, it can be provided for a cross-sectional area of a surround of the first opening to be approximately the same size as a cross-sectional area of the second membrane. This configuration means that it is possible that essentially no closing forces are introduced into the valve member via the cross-sectional area of the surround, as these forces are virtually eliminated via the cross-sectional area of the second membrane. This is due to the fact that the first chamber communicates through the valve member with the third chamber, which is delimited by the second membrane. In the closed position of the valve member, the pressure prevailing at the first opening no longer acts on the entire cross-sectional area of the first membrane, but only on the part-area which interacts with the surround of the first opening and corresponds to the cross-sectional area of the surround. Only one opening pressure spring of the pressure control valve then acts in the opening direction. This can for example be set out in a targeted manner by a progressive spring characteristic in such a manner that the cross section through which flow can pass of the gas path increasingly closes with increasing pressure difference between the first opening and the third opening, but does not close completely, at least in a predefined control range, so that extraction of gas from the second opening to the first opening is always ensured. If the pressure control valve is used in crank case ventilation, it is thus possible that the gas path remains open and sufficient ventilation of the crank case is allowed even during idling of the internal combustion engine, that is, at maximum vacuum in the intake system.

Further important features and advantages of the invention can be found in the subclaims, the drawings and the associated description of the figures using the drawings.

It is self-evident that the features which are mentioned above and those which are still to be explained below can be used not only in the combination specified in each case, but also in other combinations or alone without departing from the scope of the present invention.

Preferred exemplary embodiments of the invention are shown in the drawings and are explained in more detail in the following description, with the same reference symbols referring to the same or similar or functionally identical components.

BRIEF DESCRIPTION OF THE DRAWING

In the figures.

DETAILED DESCRIPTION

Figure 1:
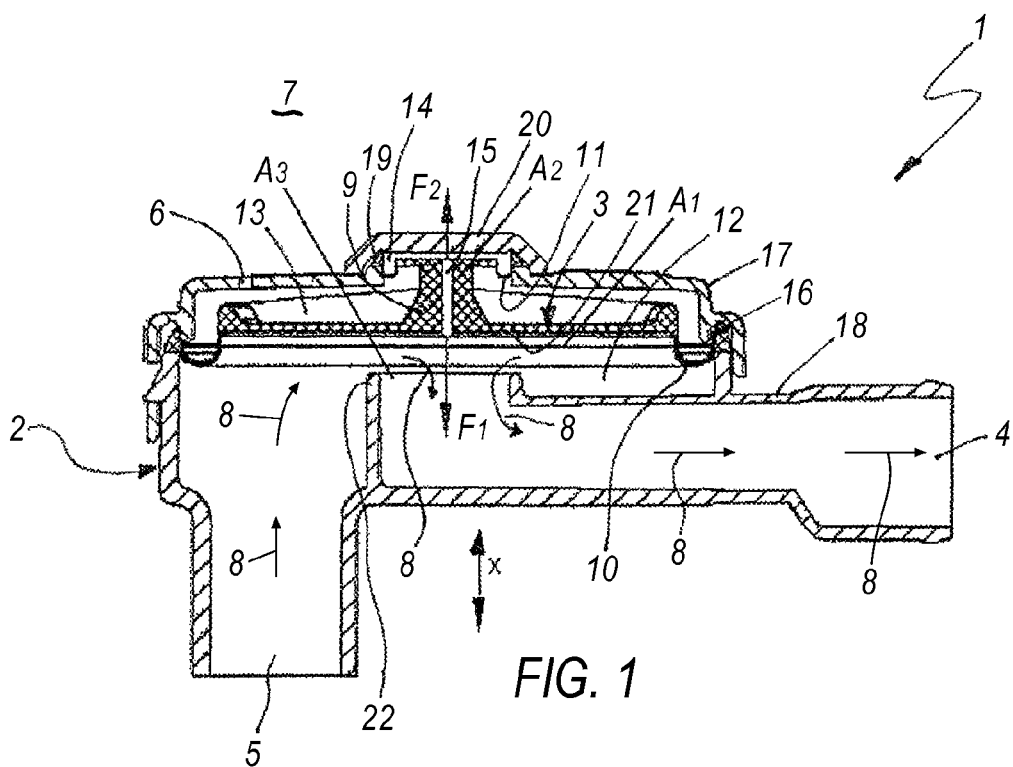
FIGS. 1 and 2 in each case schematically show a highly simplified sectional illustration of a pressure control valve in different switching states, FIG. 3 schematically shows a further sectional illustration of a pressure control valve in the region of a valve body.
Figure 2:
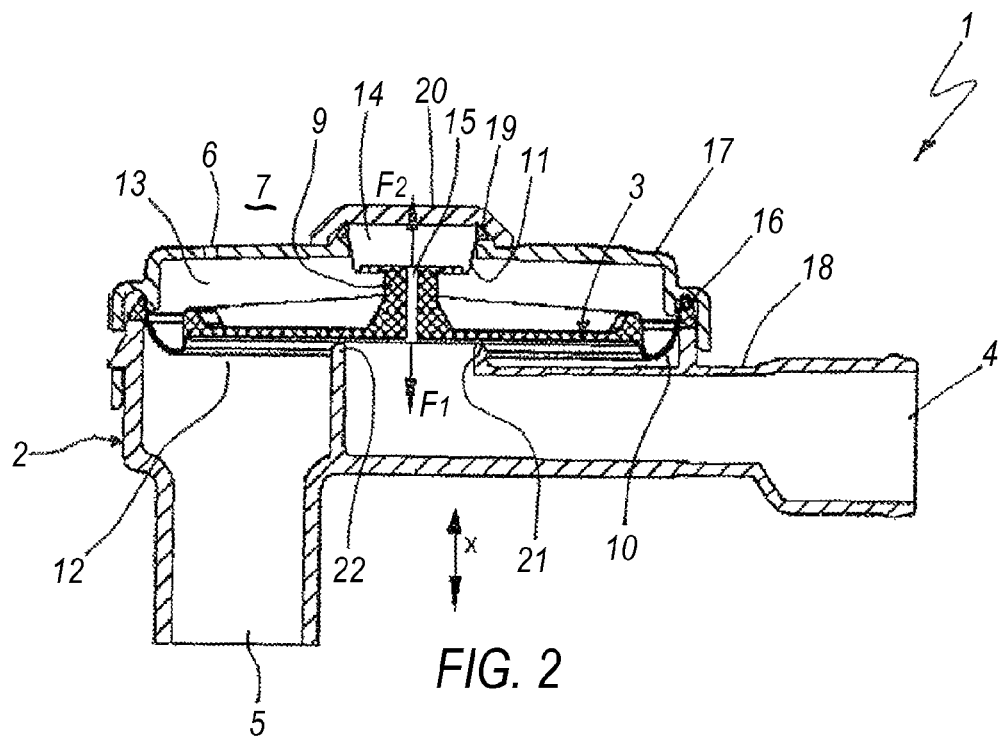
Figure 3:
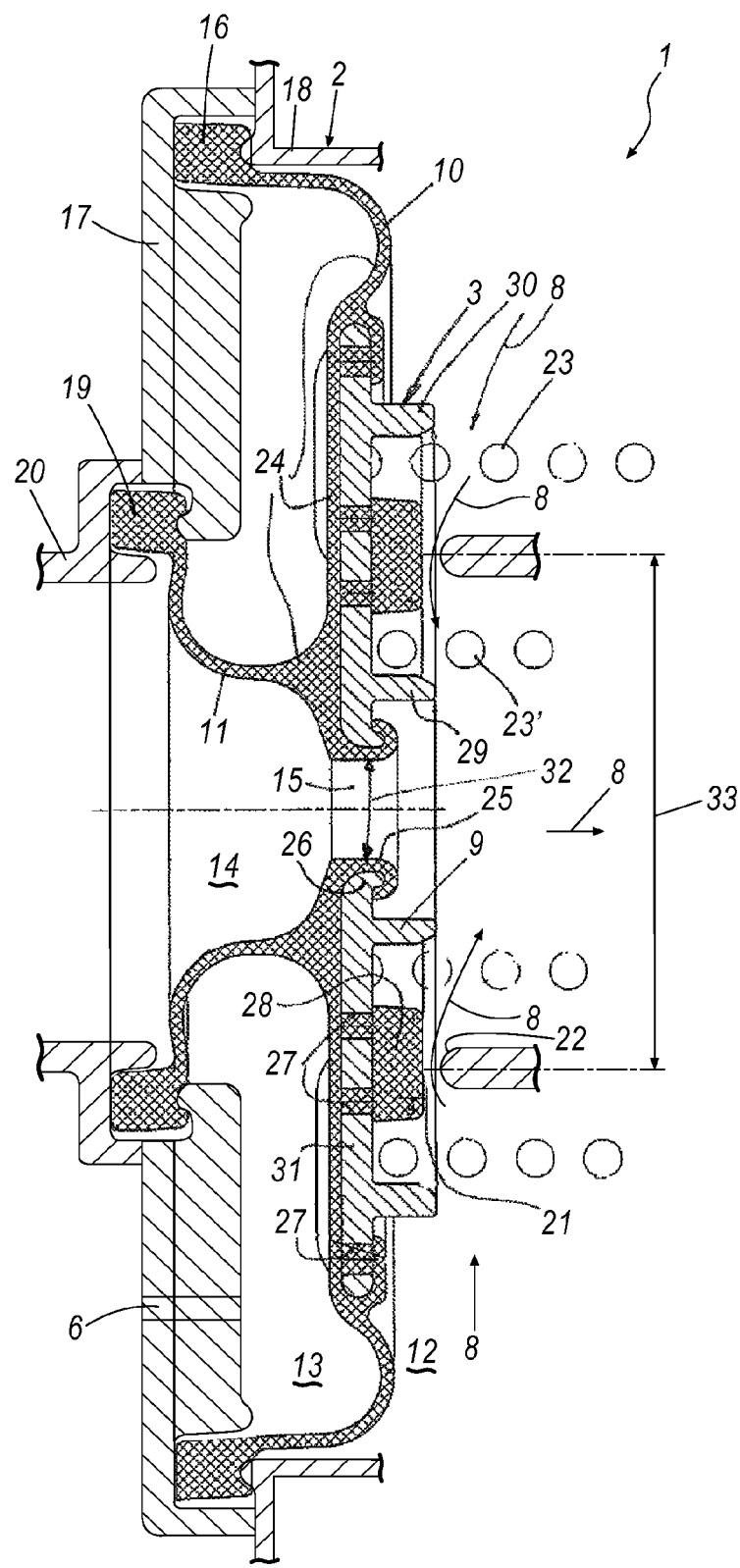

According to FIGS. 1 to 3, a pressure control valve 1 comprises a valve housing 2, in which a valve member 3 is arranged with adjustable stroke. The stroke direction of the valve member 3 is symbolised in the figures by a double arrow labelled x. According to a preferred embodiment, the pressure control valve 1 is configured in such a manner that a vacuum can be adjusted with it in a crank case of an internal combustion engine. In this case it is then a crank case ventilation pressure control valve 1.

The valve housing 2 has a first opening 4, a second opening 5 and a third opening 6. The first opening 4 is provided for connection to a vacuum source. The second opening 5 is provided for connection to a chamber, the vacuum of which is to be controlled. The third opening 6 communicates with an environment 7 of the pressure control valve 1. If it is a crank case ventilation pressure control valve 1, the first opening 4 is provided for connection to a fresh air line or intake line of a fresh air or intake system which conveys fresh air to the internal combustion engine. The second opening 5 is then provided for connection to the crank case of the internal combustion engine.

In the valve housing 2, a gas path 8 is formed, which is indicated in FIGS. 1 and 3 by arrows and connects the first opening 4 to the second opening 5, so that when the valve member 3 is open gas can flow from the second opening 5 through the valve housing 2 to the first opening 4. The valve member 3 controls a cross section, through which flow can pass, of this gas path 8 depending on the adjustment of its stroke.

The valve member 3 has a support body 9 and two membranes, namely a first membrane 10 and a second membrane 11. The first membrane 10 separates a first chamber 12 in the valve housing 2 in a gas-tight manner from a second chamber 13. The first chamber 12 communicates with the first opening 4 and the second opening 5, at least when the valve member 3 is open. The second chamber 13 communicates with the third opening 6. In contrast to this, the second membrane 11 in the valve housing 2 separates the second chamber 13 in a gas-tight manner from a third chamber 14. The third chamber 14 communicates through the valve member 3 with the first chamber 12. To this end, the valve member 3 has a connection opening 15 which in this case penetrates the valve member 3 centrally.

The first membrane 10 has a first seal 16 which interacts with the valve housing 2. For example, this first seal 16 is screwed to a base housing 18 with the aid of a housing lid 17. Moreover, the second membrane 11 has a second seal 19 which interacts with the valve housing 2. The second seal 19 can to this end be screwed to the housing lid 17 or to the base housing 18 for example with the aid of an additional lid 20. The respective membrane 10, 11 is fastened to the valve housing 2 by means of the seals 16, 19. At the same time, this realises a suspension of the valve member 3 in the valve housing 2, which allows stroke adjustments in the stroke direction x of the valve member 3 relative to the valve housing 2. The first seal 16 is integrally formed on the first membrane 10 or on the membrane body 24: The second seal 19 is likewise integrally formed on the second membrane 11 or on the membrane body 24.

The valve member 3 has a control contour 21 which interacts with a surround 22, which faces the valve member 3, of the first opening 4. In the example the surround 22 forms a valve seat, relative to which the valve member 3 can be adjusted with its control contour 21. The valve member 3 or its control contour 21 controls the cross section through which flow can pass of the gas path 8 as a function of the distance measured in the stroke direction x between the control contour 21 and the surround 22. This is because the gas must flow over the surround 22 in order to get from the second opening 5 to the first opening 4. According to a preferred embodiment, the surround 22 and the second membrane 11 are matched to each other in such a manner that a cross-sectional area $A_3$ of the surround 22 is approximately the same size as a cross-sectional area $A_2$ of the second membrane 11. The expression "approximately the same size" in the present connection means that the difference between the two cross-sectional areas A2 and A3 is less than or equal to 10%.

In the open position of the valve member 32 shown in FIG. 1, pressure forces act on the valve member 3, which pressure forces act in opposite directions and are formed by the pressure acting on the first membrane 10 in the first chamber 12 and by the pressure acting on the first membrane 10 in the second chamber 13. The difference between these opposed pressure forces produces a resulting closing force $F_1$.

At the same time an opening force $F_2$ acts on the valve member 3. This is produced by the pressure difference between the pressure prevailing at the second membrane 11 in the third chamber 14 and the pressure prevailing at the second membrane 11 in the second chamber 13. As the third chamber 14 communicates with the first chamber 12 via the connection opening 15, there is a pressure equalisation here, as a result of which the cross-sectional area $A_2$ of the second membrane 11 is to be subtracted from a cross-sectional area $A_1$ of the first membrane 10 with regard to its closing action. This opening force $F_2$ is usually reinforced by at least one opening pressure spring (not shown in FIGS. 1 and 2).

In the theoretical closing position shown in FIG. 2, the valve member 3 with its control contour 21 comes to bear against the surround 22, as a result of which the first opening 4 is closed by the valve member 3 in the region of the surround 22. The vacuum prevailing at the first opening is then automatically present in the third chamber 14 too. If the cross-sectional area $A_2$ of the second membrane 11 is approximately the same size as the cross-sectional area $A_3$ of the surround 22, the vacuum prevailing at the first opening 4 has virtually no effect on the forces acting on the valve member 3. The resulting force effective on the valve member 3 is then produced from the pressure difference between the pressure prevailing at the second opening 5 and the pressure prevailing in the second chamber 13. Moreover, at least one opening pressure spring 23 or 23' shown in FIG. 3 can be provided, which prestresses the valve member 3 in its open position. This decoupling of the pressure prevailing in the first opening 4 means that a switching characteristic or control characteristic of the pressure control valve 1 can be set out very precisely, in particular for comparatively great pressure differences between the first opening 4 and the third opening 6. A desired vacuum at the second opening 5 can in particular be set even if there is a great vacuum at the first opening 4. For example, this can be realised by means of a corresponding progressive spring characteristic of the respective opening pressure spring 23, 23'.

Whereas FIGS. 1 and 2 show the valve member 3 in a simplified illustration in order to explain the function of the pressure control valve 1, FIG. 3 shows a valve member 3 configured according to the invention or a valve member 3 which is used in the pressure control valve 1 according to the invention. The pressure control valve 1 or the valve member 3 is characterised in that the first membrane 10 and the second membrane 11 are injection moulded onto the support body 9, in such a manner that a single membrane body 24 is formed thereby, on which both membranes 10, 11 are integrally formed. The membrane body 24 which is produced in one piece in this manner or is monolithic preferably comprises a centrally arranged sleeve section 25 which is likewise integrally formed on the membrane body 24. The sleeve section 25 forms a surround for the connection opening 15. Correspondingly, the sleeve section encloses an opening edge 26 which is formed on the support body 9 and surrounds the connection opening 15. The support body 9 expediently has a plurality of holes 27, which are penetrated by the material of the membrane body 24 when the membrane body 24 is moulded on, as a result of which a form-fitting connection can be realised between the support body 9 and the membrane body 24 as well as an adhesive connection. The membrane body 24 can moreover have a control section 28 which is arranged on a side of the support body 9 which faces the first chamber 12 and on which the control contour 21 is formed. In this respect the control contour 21 is formed integrally on the membrane body 24. The control section 28, like the control contour 21, extends coaxially to the connection opening 15. In any case the connection opening 15 is situated inside the control contour 21, which is closed in a ring-shaped manner. In this manner it is ensured that the third chamber 14 is also connected via the connection opening 15 to the part of the first chamber 12 which communicates with the first opening 4 if the control contour 21 bears tightly against the surround 22 when the valve member 3 is in the closed position. The pressure forces on both sides of the valve member 3 are thereby neutralized in the seat region which is formed by the interaction of the control contour 21 with the surround 22.

The support body 9 has, for reinforcement in particular, a ring-shaped inner collar 29 and a ring-shaped outer collar 30 which extend coaxially to each other and coaxially to the connection opening 15. The two collars 29, 30 project from the rest of the support body 9 on a side facing the first chamber 12, which support body is essentially formed by a flat annular disc 31 which contains the connection opening 15. The control section 28 of the membrane body 24 extends in an annular manner between the two collars 29, 30, a radial distance being provided in the example shown both towards the inner collar 29 and towards the outer collar 30. The opening pressure spring 23 or 23' is supported on the support body 9 or on the valve member 3 in the region of this distance, that is, radially between the control section 28 and the respective collar 29, 30. If only one opening pressure spring 23, 23' is provided, this can be supported on the valve member 3 radially outside the surround 22. Alternatively, the opening pressure spring 23' can be supported on the valve member 3 radially inside the surround 22. Two opening pressure springs 23, 23' can likewise be provided, which are supported on the valve member 3 inside and outside the surround 22 as shown.

In the embodiment shown here, the membrane body 24 is injection moulded in such a manner that it delimits the second chamber 13 from the first seal 16 to the second seal without interruptions. This produces a particularly effective seal of the second chamber 13 from the first chamber 12 and from the third chamber 14. Leaks are virtually only possible via the seals 16, 19, which can however be realised with an effective sealing action. Furthermore, the membrane body 24 is optionally configured in such a manner that it delimits the third chamber 14 from the second seal 19 to the connection opening 15 without interruptions. This also contributes to an effective sealing action. To this end, the second membrane 11 merges directly into the sleeve section 25 which surrounds the connection opening 15.

The connection opening 15 has a cross-sectional area 32 which can in particular have a circular shape. In principle, other cross section geometries are also conceivable. The valve seat formed by the control contour 21 and the surround 22 has a cross-sectional area 33 which corresponds to the cross-sectional area of the surround 22 and to the cross-sectional area of the control contour 21. This cross-sectional area 33 is preferably also circular, but can in principle also have other geometries. The cross-sectional area 32 of the connection opening 15 is noticeably smaller than the cross-sectional area 33 of the seat. The cross-sectional area 32 of the connection opening 15 is however preferably not selected arbitrarily, but with a minimum size in relation to the cross-sectional area 33 of the seat. The cross-sectional area 32 of the connection opening 15 is preferably at least ⅕ of the cross-sectional area 33 of the seat. The cross-sectional area 32 of the connection opening 15 is preferably at most ¼ of the cross-sectional area 33 of the seat. With circular cross sections, this corresponds to a diameter ratio of at least 1:5 to a maximum of 1:2. A large opening cross section of the connection opening 15 can reduce the risk of the connection opening 15 icing up, as water can simply flow away.

The invention claimed is:
1. A pressure control valve, comprising:
a valve housing having a first opening and a second opening,
a valve member being arranged in the valve housing with an adjustable stroke configured to control a cross section through which gas can pass, the cross section connecting the first opening to the second opening,
wherein the valve member has a support body with a first membrane and a second membrane,
wherein the first membrane in the valve housing separates a first chamber from a second chamber, the first chamber communicating with the first opening and the second opening in a gas-tight manner, the second chamber communicating with a third opening of the valve housing,
wherein the second membrane in the valve housing separates the second chamber in a gas-tight manner from a third chamber, the third chamber communicating through the valve member with the first chamber,
wherein the first membrane and the second membrane are integrally formed on a single-piece membrane body which is injection molded onto the support body,
wherein the first membrane has a first seal which interacts with the valve housing and the second membrane has a second seal which interacts with the valve housing, and further wherein the single-piece membrane body delimits the second chamber from the first seal to the second seal without interruptions, such that the single-piece membrane body has a continuous surface that extends from the first seal to the second seal.

2. The pressure control valve according to claim 1, wherein the valve member has a control contour configured to control the cross section through which gas can pass depending on the distance of the contour from a surround, the surround facing the first opening of the valve member.

3. The pressure control valve according to claim 2, wherein the control contour is formed integrally on the membrane body.

4. The pressure control valve according to claim 2, wherein a cross-sectional area of the surround is approximately the same size as a second cross-sectional area of the second membrane.

5. The pressure control valve according to claim 2, wherein the valve member has a connection opening which connects the first chamber to the third chamber.

6. The pressure control valve according to claim 5, wherein the control contour surrounds the connection opening.

7. The pressure control valve according to claim 5, wherein the membrane body delimits the third chamber from a second seal which is formed on the second membrane and interacts with the valve housing and the connection opening without interruptions.

8. The pressure control valve according to claim 5, wherein the connection opening is surrounded by a sleeve section which is integrally formed on the membrane body.

9. The pressure control valve according to claim 5, wherein the connection opening has an opening cross-sectional area which is at least $1/25$ to $1/4$ of a cross-sectional area of a surround of the first opening with which the valve member interacts to control the cross section through which gas can pass.

10. The pressure control valve according to claim 1, further comprising at least one opening pressure spring disposed on the support body of the valve member.

11. A crank case ventilation pressure control valve comprising:
  a valve housing having a first opening and a second opening,
  a valve member being arranged in the valve housing with an adjustable stroke configured to control a cross section through which gas can pass, the cross section connecting the first opening to the second opening, and
  a pair of springs moving the valve member toward an open position,
  wherein the first opening is provided for connection to a fresh air line which conveys fresh air to an internal combustion engine,
  wherein the second opening is provided for connection to a crank case of the internal combustion engine,
  wherein the third opening communicates with an outer environment of the pressure control valve,
  wherein the valve member has a single-piece membrane body which is injection molded onto the support body, and the valve member has a first membrane and a second membrane integrally formed on the single-piece membrane body,
  wherein the first membrane has a first seal which interacts with the valve housing and the second membrane has a second seal which interacts with the valve housing, and further wherein the single-piece membrane body delimits a chamber from the first seal to the second seal without interruptions.

12. The pressure control valve according to claim 3, wherein the control contour is formed on a control section which is arranged on a side of the support body which faces the first chamber.

13. The pressure control valve according to claim 12, wherein the membrane body includes the second membrane on a first side of the support body and the control section on a second side of the support body.

14. The pressure control valve according to claim 12, wherein the support body has a plurality of holes, the holes being penetrated by the material of the membrane body when the membrane body is molded on.

15. The pressure control valve according to claim 12, wherein the membrane body includes the second membrane on a first side of the support body and the control section on a second side of the support body, and wherein the support body has a plurality of holes, the holes being penetrated by the material of the membrane body when the membrane body is molded on.

16. The pressure control valve according to claim 1, wherein the valve member has a control contour configured to control the cross section through which gas can pass depending on the distance of the contour from a surround, the surround facing the valve member.

17. The pressure control valve according to claim 3, wherein a cross-sectional area of the surround is approximately the same size as a second cross-sectional area of the second membrane.

18. The pressure control valve according to claim 1, wherein the valve member has a connection opening which connects the first chamber to the third chamber.

19. A pressure control valve, comprising:
  a valve housing having a first opening and a second opening,
  a valve member being arranged in the valve housing with an adjustable stroke configured to control a cross section through which gas can pass, the cross section connecting the first opening to the second opening,
  wherein the valve member has a support body with a first membrane and a second membrane,
  wherein the first membrane in the valve housing separates a first chamber from a second chamber, the first chamber communicating with the first opening and the second opening in a gas-tight manner, the second chamber communicating with a third opening of the valve housing,
  wherein the second membrane in the valve housing separates the second chamber in a gas-tight manner from a third chamber, the third chamber communicating through the valve member with the first chamber,
  wherein the first membrane and the second membrane are integrally formed on a single-piece membrane body which is injection molded onto the support body,
  wherein the valve member has a control contour configured to control the cross section through which gas can pass depending on the distance of the contour from a surround, the surround facing the first opening of the valve member,
  wherein the control contour is formed integrally on the membrane body,
  wherein a cross-sectional area of the surround is approximately the same size as a second cross-sectional area of the second membrane,
  wherein the valve member has a connection opening which connects the first chamber to the third chamber.

* * * * *